United States Patent

Takeuchi et al.

Patent Number: 5,862,929
Date of Patent: Jan. 26, 1999

[54] BOTTLE HAVING A HANDLE FORMED BY STRETCH BLOW MOLDING

[75] Inventors: Setsuyuki Takeuchi; Nobukuni Ibe, both of Nagano-ken, Japan

[73] Assignee: A.K. Technical Laboratory, Inc., Nagano-ken, Japan

[21] Appl. No.: 753,700

[22] Filed: Nov. 27, 1996

[30] Foreign Application Priority Data

Nov. 27, 1995 [JP] Japan ..................................... 7-329415

[51] Int. Cl.⁶ ............................. B65D 1/02; B65D 23/10
[52] U.S. Cl. ...................... 215/398; 215/384; 215/396; 220/771
[58] Field of Search ................................... 215/383, 384, 215/386, 396, 398; 220/752, 771

[56] References Cited

U.S. PATENT DOCUMENTS

| | | | |
|---|---|---|---|
| 3,384,258 | 5/1968 | Singier | 215/398 |
| 3,441,172 | 4/1969 | Dike | 215/398 X |
| 3,463,536 | 8/1969 | Updegraff et al. | 215/396 X |
| 4,050,070 | 9/1977 | Geisinger | 215/396 X |
| 4,372,454 | 2/1983 | Thompson | 215/398 |
| 4,395,378 | 7/1983 | Alberghini et al. | 215/375 X |
| 4,629,598 | 12/1986 | Thompson | 264/537 |
| 4,804,119 | 2/1989 | Goodall | 215/398 X |
| 4,993,565 | 2/1991 | Ota et al. | |
| 5,008,066 | 4/1991 | Mueller . | |
| 5,086,937 | 2/1992 | Robinson | 215/100 |
| 5,409,749 | 4/1995 | Uehara et al. | 215/399 X |

FOREIGN PATENT DOCUMENTS

| | | |
|---|---|---|
| 0061511 | 10/1982 | European Pat. Off. . |
| 479139 | 4/1992 | European Pat. Off. . |
| 0732187A1 | 9/1996 | European Pat. Off. . |
| 732187 | 9/1996 | European Pat. Off. . |
| 56-30828 | 3/1981 | Japan . |
| 3-268907 | 11/1991 | Japan . |
| 1813058 | 6/1989 | U.S.S.R. . |
| 1573373 | 8/1980 | United Kingdom . |
| 2041286 | 9/1980 | United Kingdom . |
| 82/02369 | 7/1982 | WIPO . |
| 8202369 | 7/1982 | WIPO . |

Primary Examiner—Sue A. Weaver
Attorney, Agent, or Firm—Ostrolenk, Faber, Gerb & Soffen, LLP

[57] ABSTRACT

There is provided a bottle having a handle formed by stretch blow molding comprising an improved structure which facilitates carrying even a relatively large bottle in which a bendable handle having a flat shape extending in a transverse direction is integrally formed below a threaded portion of a neck of the bottle, and a connecting portion of said handle includes a narrow portion which is transversally provided by reducing the thickness at an intermediate portion of the connecting portion, whereby making the finger engaging tab bendable at the narrow portion in upper and lower directions, and molecular orientation of the resin material is performed by the narrow portion.

18 Claims, 3 Drawing Sheets

BOTTLE HAVING A HANDLE FORMED BY STRETCH BLOW MOLDING

BACKGROUND OF THE INVENTION

1. Field of the Invention

This invention relates to a stretch blow molded bottle having a handle provided on its neck portion.

2. Background Art

It is known to injection mold a preform having a handle which is integrally formed and extended longitudinally and downwardly from a side surface positioned below a threaded portion of a neck of said preform and stretch blow mold said preform into a bottle which has a thin body wall from a distal end of the neck to a bottom so as to obtain a bottle integrally having a handle.

Such a bottle having a handle is disclosed in, for example, GB-A-2041286, EP-A-0061511, U.S. Pat. No. 4,629,598, JP-A-3-268907, EP-A-0479139 etc.

Also in JP-A-56-30828, there is disclosed a bottle formed by stretch blow molding in which a ring shaped handle is integrally formed on a neck in a longitudinal direction.

This conventional handle has a certain thickness so as to acquire a strength. If a resin used as a material for molding a bottle is polyethylene terephthalate, although it has a certain hardness as no further process is provided after the injection molding, it lacks an impact strength. As a result, damage of the handle can occur when the bottle filled with contents accidentally falls down on the ground from a shelf or the like. On the other hand, if the resin used is polypropylene, the handle will not be damaged when falling down the bottle because of its flexibility. However, the hardness of an integral handle is not sufficient and therefore a separately formed handle which is made of polyethylene is mounted afterward.

Another stretch blow molded bottle in which a ring shaped handle, besides the above mentioned handle, is integrally formed in a horizontal direction is disclosed in WO82/02369. However, this ring shaped handle has the same thickness as the ring formed on the neck of the bottle. Thus, if the resin is polyethylene terephthalate as typically used for this type of bottle, the handle lacks flexibility and it is difficult to carry the bottle when it is filled. In addition, there is a possibility of easily breaking of the handle when it is bent.

It is an object of the present invention to provide a newly structured bottle having a handle formed by stretch blow molding, wherein a bendable handle having a flat shape and extending in a transverse direction is integrally formed on a lower side of the neck of the bottle to facilitate carrying even a relatively large bottle.

SUMMARY OF THE INVENTION

According to an aspect of the present invention, there is provided a bottle having a handle which is integrally formed at a lateral portion below a threaded portion provided on the neck of the bottle at the time when a preform for the bottle is injection molded, and has a flat shape extending in a transverse direction, comprises a connecting portion connected to the neck and an annular finger engaging tab which has a larger width than that of the connecting portion, and said connecting portion including a narrow portion which has a reduced thickness and is transversally provided at an intermediate portion of the connecting portion, whereby making the finger engaging tab bendable at the narrow portion in upper and lower directions, and molecular orientation of the resin is performed by said narrow portion.

In addition, in the above construction a concave portion for supporting it by one's fingers may be provided at the bottom of the bottle on the side opposite to the portion where the handle is positioned in order to facilitate pouring of the contents by means of the handle.

The bottle may be made of polyester resins such as polyethylene terephthalate, polyethylene naphthalate or the like, or polypropylene. In a case where the resin is polypropylene, the flexibility of polypropylene can be added to the bottle. In a case where the used resin is polyethylene terephthalate, even if no further processing is provided to the handle after injection molding, an outer portion of the handle from the narrow portion will have flexibility caused by performing molecular orientation at the narrow portion and thereby bending strength and impact strength can be increased and consequently the handle will become difficult to chip though it has been thinly formed.

DETAILED DESCRIPTION OF THE PREFERRED EMBODIMENTS

Figure 1:
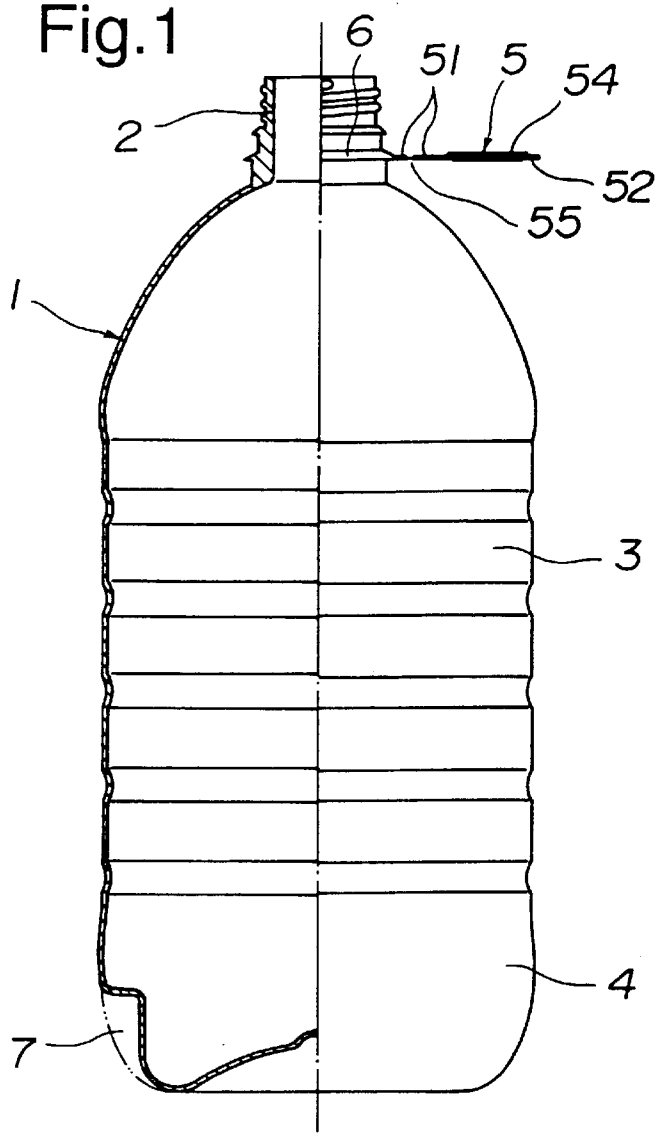
FIG. 1 is a front view a half of which shows a cross sectional view of a bottle having a handle formed by stretch blow molding according to the present invention.
Figure 2:
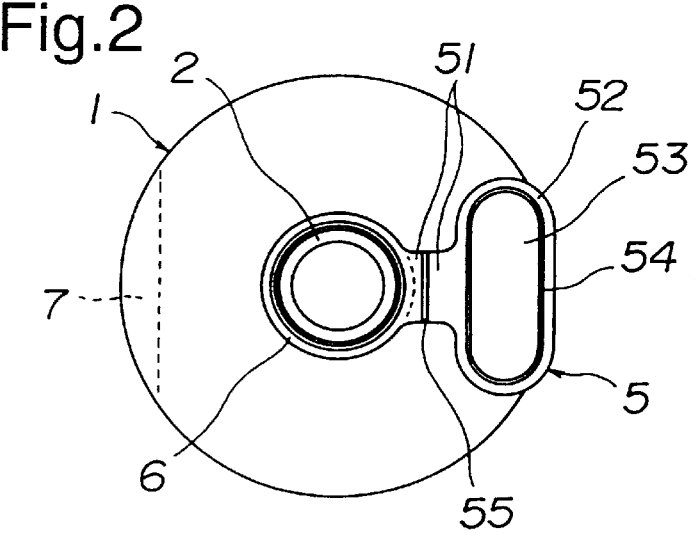
FIG. 2 is a plane view of the bottle having the handle formed by stretch blow molding according to the present invention.
Figure 3:
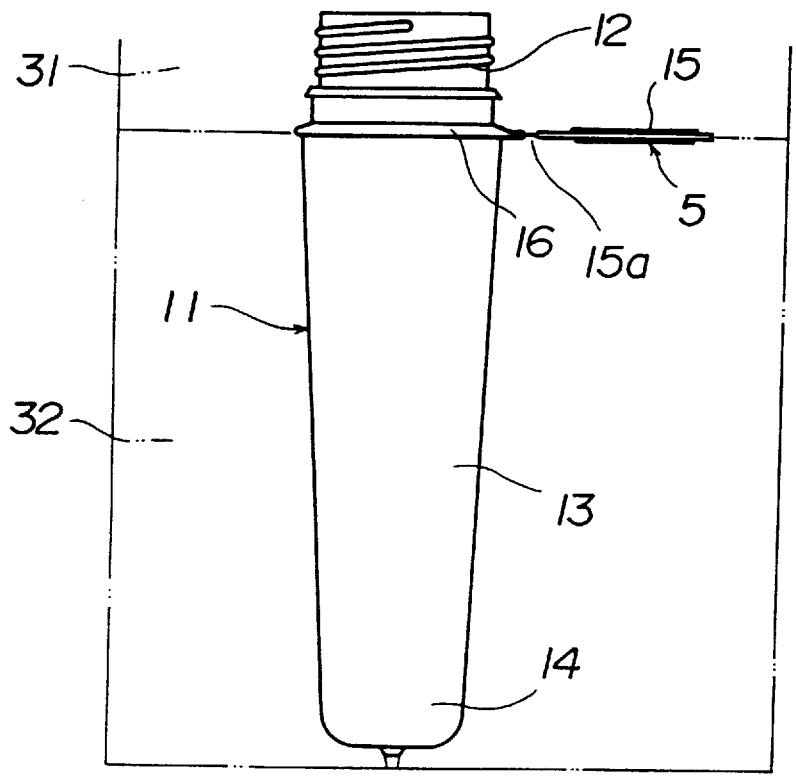
FIG. 3 is a front view of a preform in which the handle is integrally formed.
Figure 4:
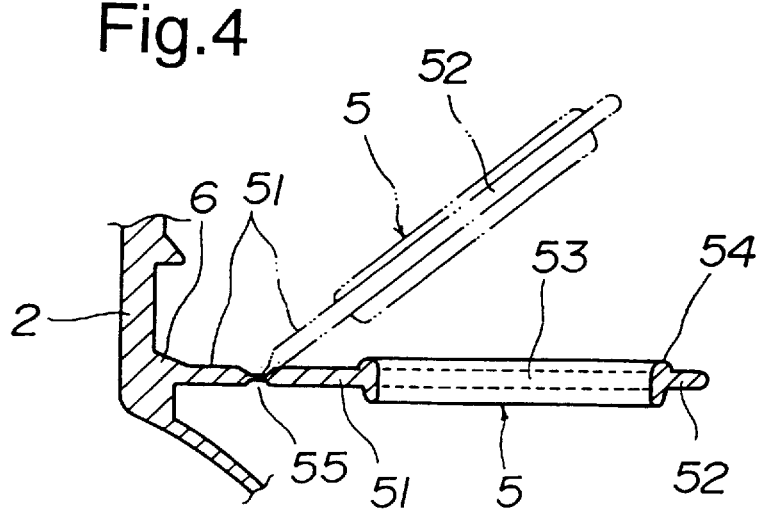
FIG. 4 is a partial sectional front view showing particularly the handle portion.

In figures, numeral 1 designates a bottle made of polyethylene terephthalate, a neck 2 which is not processed after injection molded and the bottle is formed to have a thin wall thickness by stretch blow molding from the distal end of the neck 2 to a body 4 and a bottom 3.

Numeral 5 designates a handle which is formed integrally on one side of a support ring 6 formed below a threaded portion of the neck 2. The handle 5 has a flat shape and extends in a transverse direction. In addition, it comprises a connecting portion 51 connected to the neck and an annular finger engaging tab 52 which has a larger width than that of the connecting portion and is formed at its free end. The periphery of a finger tip insertion hole 53 formed within the finger engagement tab 52 is reinforced with a convex edge 54 which is slightly projected in both upper and lower directions around the inner peripheral edge in order to lighten the load on a finger which is engaged with the finger engaging tab 52. Taking a facilitation of carrying the bottle into account, the width of the finger tip insertion hole 53 preferably has a space enough to accommodate at least three fingers, i.e. about more than 5 cm.

The above described connecting portion 51 includes a narrow portion 55 which is transversally provided at an intermediate portion of the connecting portion and has a thinner thickness than that of the connecting portion so as to make the finger engaging tab 52 bendable at the narrow portion 55 in upper and lower directions. In addition, since molecular orientation of the resin is performed by said narrow portion when injection molded, the side of the finger engaging tab may have flexibility while having a certain strength.

The dimension of the thickness of the narrow portion is not particularly subjected to any limitations, however, molecular orientation must be performed at the narrow portion. Without performance of molecular orientation, the narrow portion, although its thickness is made thinner, is provided with no strength against bending, like in a conventional bottle in which there is no difference in thickness, and consequently may cause breaking of the handle portion when it is forced to be bent.

The thickness of the narrow portion is preferably 0.5 mm or less, most preferably 0.3 mm or less.

The length of the narrow portion in a longitudinal direction is preferably 1.5 mm or more and it may be the same as that of the connecting portion, i.e. the entire connecting portion is the narrow portion.

The handle 5 is injection molded at the same time a preform 11 is injection molded. The molding can be easily performed by forming a flat cavity 15 for the handle 5 connected with a support ring 16 of a neck 12 at a parting surface between a forming mold 31 for the neck 12 and a forming mold 32 for a body 13 and a bottom 14, and injection filling a molten resin through the support ring 16 into the flat cavity 15.

The resin material filled into the cavity 15 through the support ring 16 is pressed out through a passage to limit a flow of resin by protrusions projected from both upper and lower surfaces of the cavity, i.e. the narrow portion 15a in the cavity and is forced to flow into the side of the finger engaging tab. At the same time, of the resin is oriented in a direction of a flow of resin.

Figure 5:
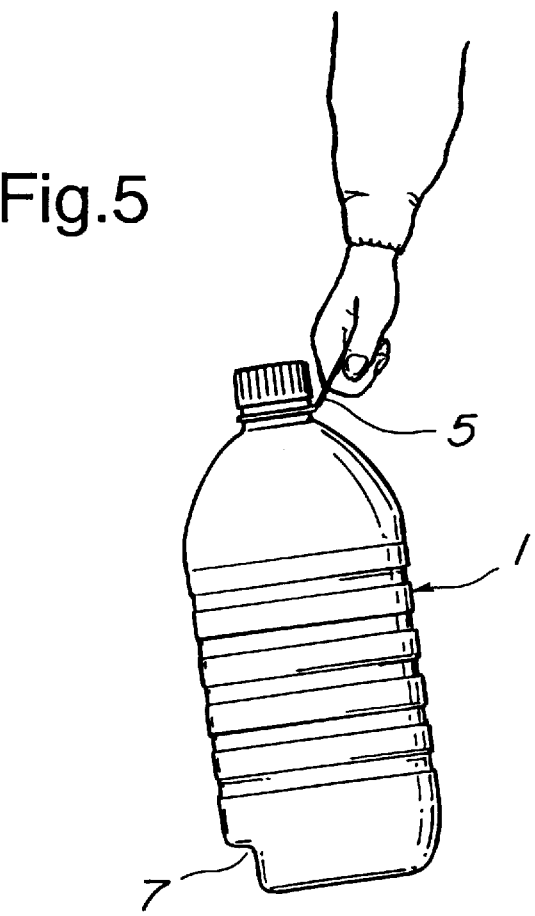
FIG. 5 is a explanatory view showing an application of the bottle having the handle formed by stretch blow molding according to the present invention.

Thus, as shown in FIG. 5, the handle 5 provided even on a large sized bottle which is filled with contents will not break when it is bent, and it facilitates carrying of the bottle since the handle has sufficient strength even in a bent condition.

At the side of the finger engaging tab where the molecular orientation has been performed, even when the bottle 1 is made of polyethylene terephthalate, the handle will have flexibility. Thus the narrow portion 55 having a thinner thickness will not be torn as a result of fatigue after bending the side of the finger engaging tab repeatedly in upper and lower directions, as a case where polypropylene is used. However, in a bottle in which the narrow portion 55 is not provided the side of the finger engaging tab can be easily broken because it is hard to bend because of its solidity, even when its thickness is approximately 1.5 mm, and also because it hardly possesses flexibility.

Figure 6:
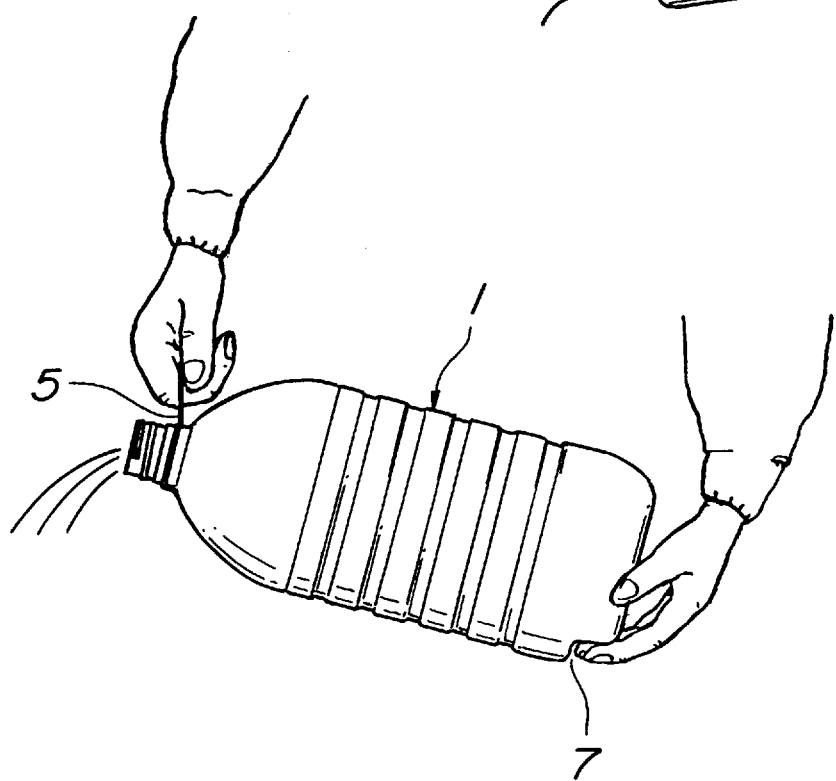
FIG. 6 is another explanatory view showing an application of the bottle having the handle formed by stretch blow molding according to the present invention.

Numeral 7 designates a concave portion for supporting the bottle by one's fingers which is provided at the bottom of the bottle 1 on the side opposite to the portion where the handle is positioned and is formed at the time when the bottle 1 is stretch blow molded. As shown in FIG. 6, the concave portion 7 is provided in order to facilitate inclining the bottle 1 when pouring liquid contents by engaging a finger or fingers on one hand into the handle 5 while supporting the bottom 4 with the other hand. The concave portion 7 may preferably be adopted to relatively large bottles include a capacity of 3 litters and having a problem because of weight of the contents and a diameter of the bottle.

The above mentioned bottle 1 is capable of carrying by engaging a fingertip or fingertips into the finger engaging tab 52 of the handle 5, pouring the contents as mentioned above, and carrying the handle with one hand while supporting the bottom by the other hand with engaging fingertips to the concave portion 7. Since the handle is flat and thinly formed, it requires less resin material than a conventional handle does. In addition, since the handle is restorable when bent at the narrow portion, it does not take any extra space when the bottle is packed in a box.

EXAMPLE 1

Used Resin Polyethylene terephthalate
Size of the bottle
Capacity 3 litters
Height (mm) Total height 309, Neck 33 mm
Diameter (mm) 130
Size of the handle
Length (mm) Total length 40, Connecting portion 10 (including 2 mm of width of the narrow portion), Finger engaging tab 30
Width (mm) Connecting portion 22, Finger engaging tab 64
Thickness (mm) Flat portion 1.5, Narrow portion 0.3

COMPARATIVE EXAMPLE 1

The narrow portion is excluded from the bottle described in the above Example 1 and a portion having a thickness of 1.5 mm which is same as the flat portion is provided instead.

Two of the above mentioned bottles are filled with water and carried by engaging fingers into the respective handle.

The bottle according to the present invention described in the Example 1 was easily carried due to bending of the handle in upper direction as shown in FIG. 5. No crack or the like was seen on the bendable narrow portion after 20 repeated bendings.

Conversely, in the bottle described in the Comparative Example 1, the handle could not been bent sufficiently because of the thickness provided which is same as the flat portion, and consequently caused difficulty in carrying of the bottle. The handle was forced to bend during carrying of the bottle, which cause cracks and then tearing off of the handle itself.

What is claimed is:

1. A bottle comprising an integrally formed neck, handle and body,
   a portion of said neck having threads,
   said body being a stretch blow molded member extending from a distal end of said neck to a bottom with a portion of the bottle from the distal end of the neck to the bottom of the body being thinly formed,
   said handle extending along a first axis from a lateral portion of said neck disposed from the threaded portion of said neck closest to said distal end to a free end of said handle, said free end having an annular finger engaging tab, said annular finger engaging tab having a width which is greater than the width of a portion of the handle between said tab and said neck,
   a portion of said handle between said tab and said neck being molecularly oriented and having a reduced thickness relative to another portion of said handle,
   wherein said first axis is transverse of said bottle, said width is transverse of said first axis and said thickness is the direction parallel to the longitudinal axis of the bottle,
   whereby said finger engaging tab is bendable upwardly and downwardly at said reduced thickness portion.

2. A bottle according to claim 1, wherein said bottle comprises a concave portion for engaging a finger provided at the bottom of said bottle on a side opposite to the portion where said handle is positioned.

3. A bottle according to claim 2, wherein the bottle is made of polyester resin.

4. A bottle according to claim 3, wherein said reduced thickness is no more than 0.5 mm.

5. A bottle according to claim 4, wherein the inner peripheral edge of said annular finger engaging tab is reinforced by a convex edge which protrudes in upper and lower directions around the inner peripheral edge.

6. A bottle according to claim 5, wherein said width of the hole of said annular finger engaging tab is at least about 5 cm.

7. A bottle according to claim 6, wherein the length of said molecular oriented portion along said first axis is at least 1.5 mm.

8. A bottle according to claim 7, wherein said reduced thickness is no more than 0.3 mm.

9. A bottle according to claim 1, wherein said bottle is made of polyester resin.

10. A bottle according to claim 9, wherein said reduced thickness is no more than 0.5 mm.

11. A bottle according to claim 10, wherein the inner peripheral edge of said annular finger engaging tab is reinforced by a convex edge which protrudes in upper and lower directions around the inner peripheral edge.

12. A bottle according to claim 11, wherein said width of the hole of said annular finger engaging tab is at least about 5 cm.

13. A bottle according to claim 12, wherein the length of said molecular oriented portion along said first axis is at least 1.5 mm.

14. A bottle according to claim 13, wherein said reduced thickness is no more than 0.3 mm.

15. A bottle according to claim 1, wherein said reduced thickness is no more than 0.5 mm.

16. A bottle according to claim 1, wherein the inner peripheral edge of said annular finger engaging tab is reinforced by a convex edge which protrudes in upper and lower directions around the inner peripheral edge.

17. A bottle according to claim 1, wherein said width of the hole of said annular finger engaging tab is at least about 5 cm.

18. A bottle according to claim 1, wherein said reduced thickness is no more than 0.3 mm.

* * * * *